March 8, 1949.
V. H. TYLER
2,463,578
MACHINE FOR ALIGNING AND SIZING
ELONGATED ROLLABLE ARTICLES
Filed May 27, 1946
3 Sheets-Sheet 1
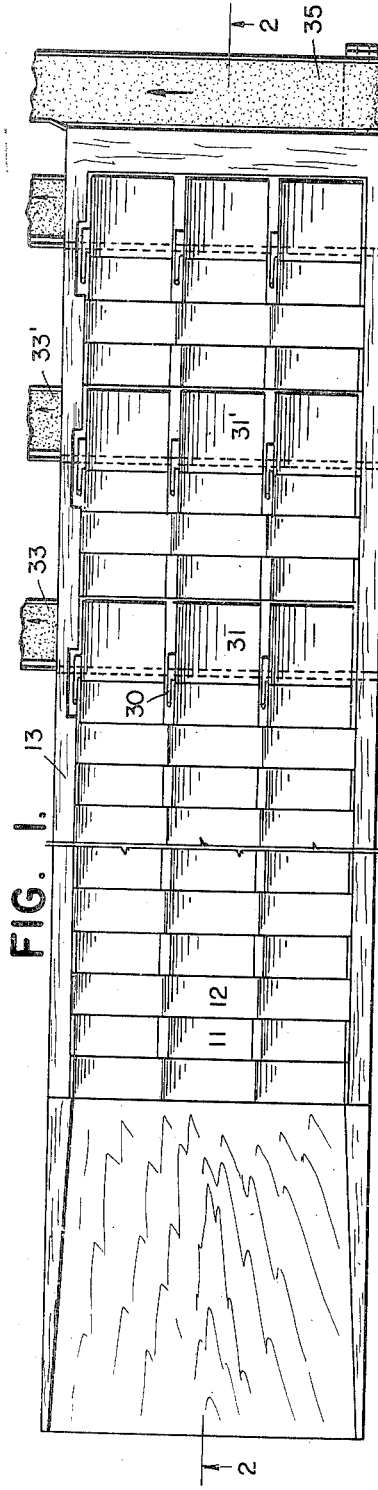
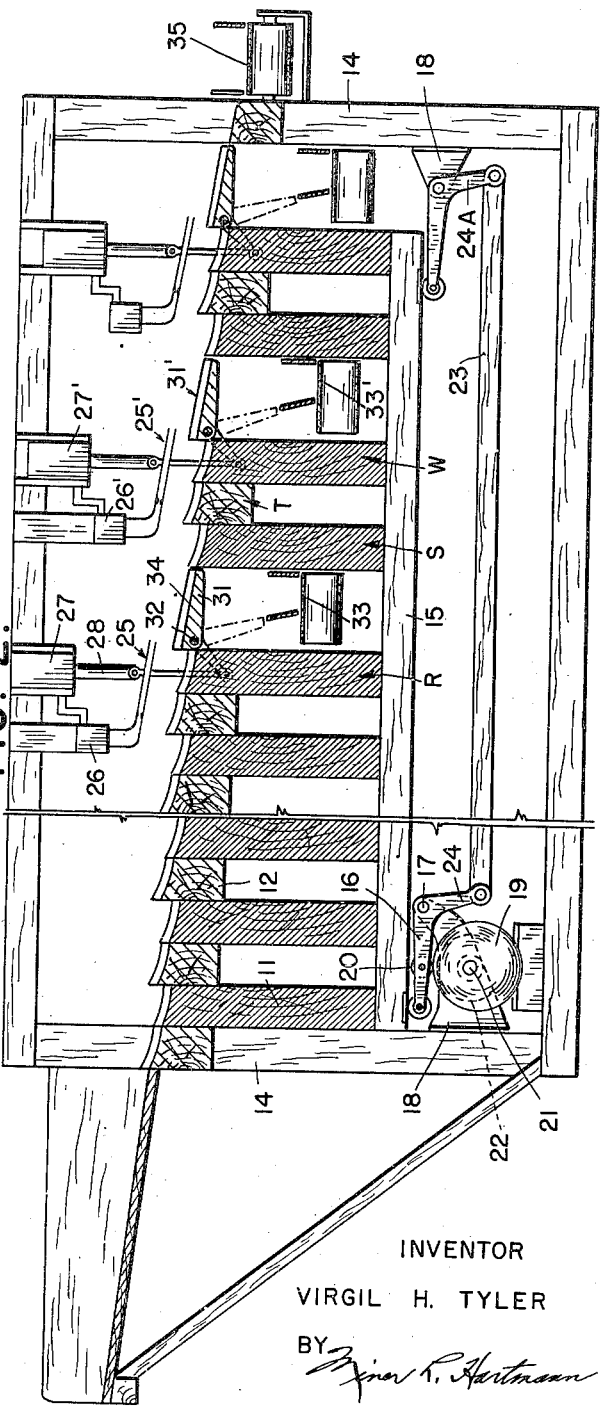
INVENTOR
VIRGIL H. TYLER
BY
ATTORNEY March 8, 1949.  V. H. TYLER  2,463,578
MACHINE FOR ALIGNING AND SIZING
ELONGATED ROLLABLE ARTICLES Filed May 27, 1946  3 Sheets-Sheet 2

INVENTOR
VIRGIL H. TYLER
BY
ATTORNEY

March 8, 1949.
V. H. TYLER
MACHINE FOR ALIGNING AND SIZING
ELONGATED ROLLABLE ARTICLES
2,463,578
Filed May 27, 1946
3 Sheets-Sheet 3
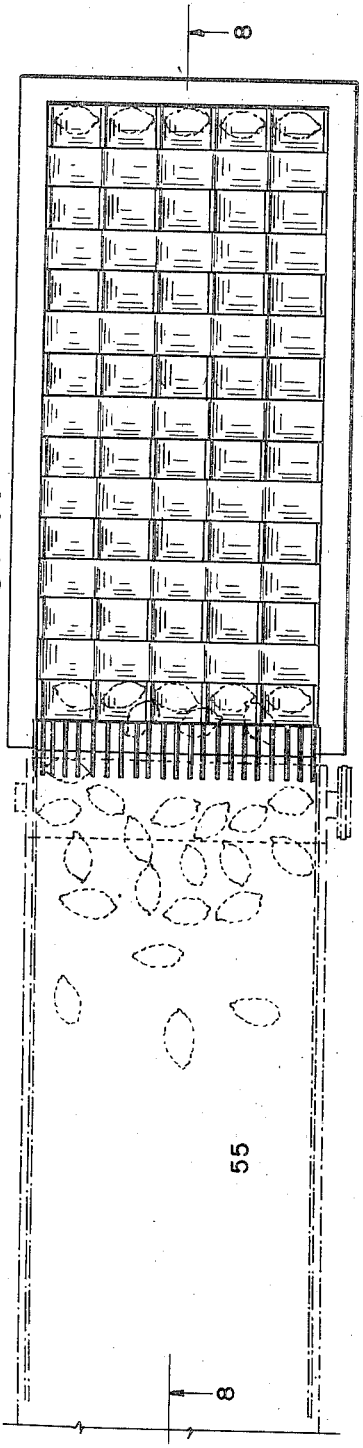
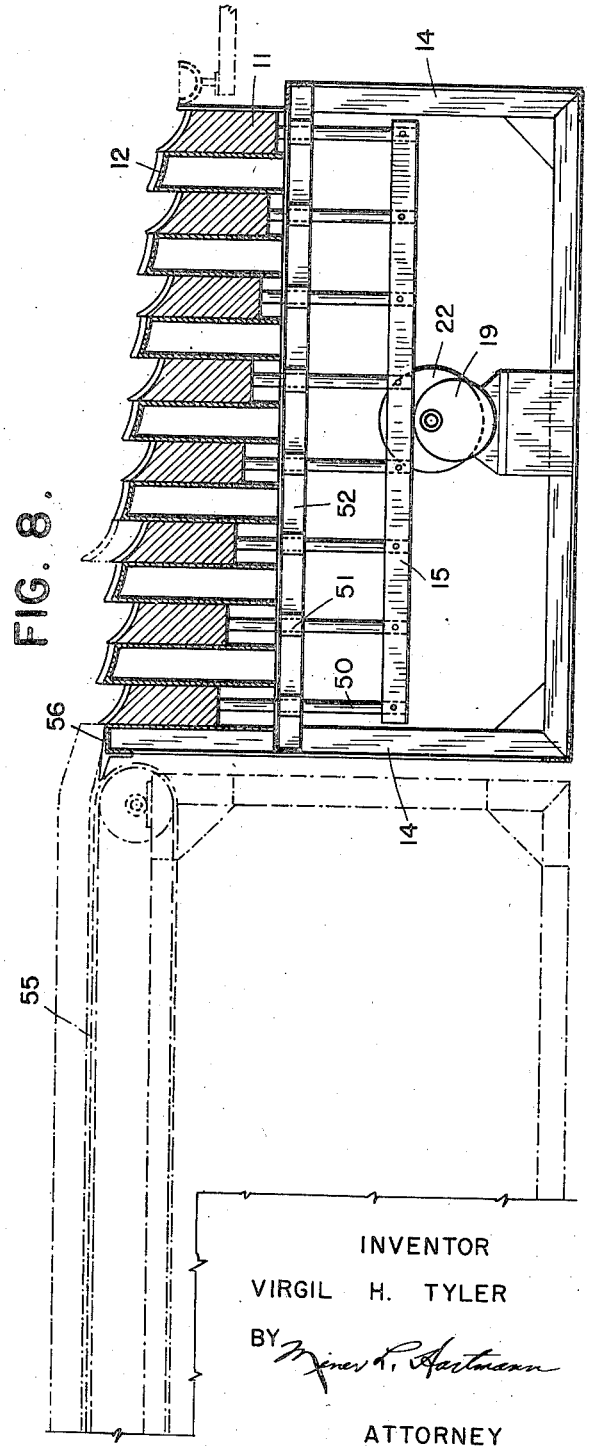
INVENTOR
VIRGIL H. TYLER
BY *Miner L. Hartmann*
ATTORNEY Patented Mar. 8, 1949

2,463,578

UNITED STATES PATENT OFFICE 2,463,578

MACHINE FOR ALIGNING AND SIZING ELONGATED ROLLABLE ARTICLES

Virgil H. Tyler, Ventura, Calif.

Application May 27, 1946, Serial No. 672,441

4 Claims. (Cl. 209—88)

This invention relates to an aligning-feeder and sizer, particularly adapted for handling fruit.

One object of the invention is to provide in combination a feeder and aligner device which delivers articles in single layered parallel rows and a sizing means. Another object is to provide in combination with sizing means, a feeding device which aligns specimens of elipsoidal shaped fruit in parallel rows of single layers, the specimens also being aligned with their longer axes at right angles to the rows. Still another object is to provide a machine for aligning specimens of fruit without bruising or injuring them in combination with sizing means. Another object is to provide a machine for sizing ellipsoidal shaped fruit. A further object is to provide a sizing machine which removes the larger sizes first. These and other objects are attained by my invention which will be understood from the following description, reference being made to the accompanying drawings in which:

Fig. 1 is a plan view showing a preferred form of my feeder and sizing machine;

Fig. 2 is a cross-sectional view taken on the line 2—2 of Fig. 1;

Fig. 7 is a plan view of alternative form of my aligning feeder;

Fig. 8 is a cross-sectional view taken on the line 8—8 of Fig. 7.

Figure 3:
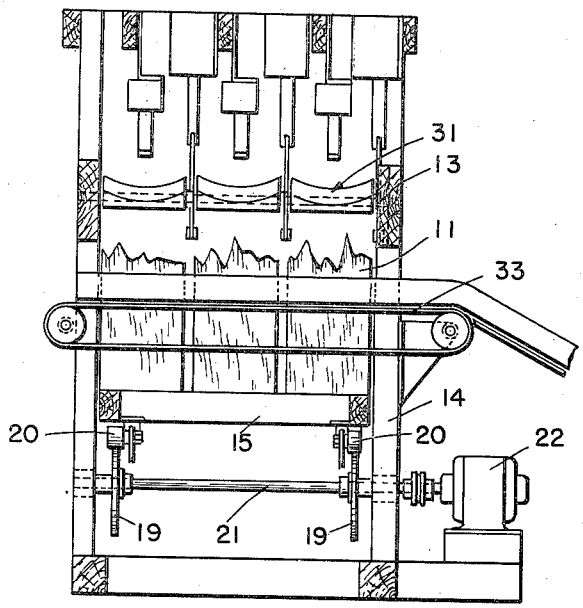
Fig. 3 is a discharge end elevational view.
Figure 4:
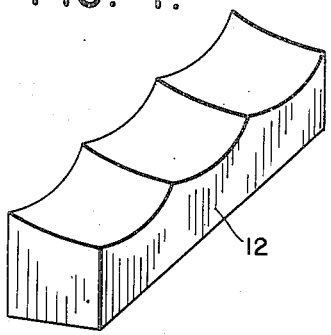
Fig. 4 is an isometric view showing the top surfaces of the fixed and moving members of my fruit feeder.
Figure 5:
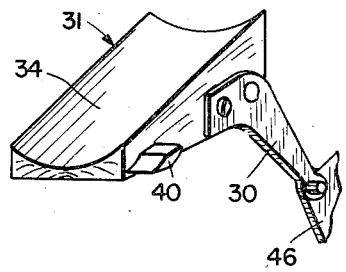
Fig. 5 is an isometric view of a trap-door used in the sizing portion of my machine.

Referring to the drawings, particularly Figs. 1 to 6, my combined feeder and sizer consists in general of an initial aligner-feeder portion and a subsequent sizer portion. The aligner-feeder portion consists of vertically reciprocating blocks or bars 11 spaced alternately between fixed blocks or bars 12, the fixed blocks or bars being supported on side frame members 13 which are supported in position by suitable frame members 14. The top surface of each of the fixed blocks or bars is provided with a rounded out groove or grooves to form one or more short longitudinal troughs sloping generally downward in the direction from the feed end to the discharge end of the machine. The troughed blocks if in separated units are arranged together in rows constituting bars with as many rows crosswise of the machine as may be desired for separate paths of travel, three being shown in the drawings. The vertically reciprocating blocks or bars 11 are also troughed on their top surfaces in the same manner and in matching formation with the adjacent fixed blocks or bars, so that when the moveable block or bar is in the "up" position, its top surface forms a smooth trough or series of parallel troughs with the fixed block or bar surface next adjacent on the side toward the discharge end of the machine, and when the moveable block or bar is in the "down" position, its top surface forms a smooth trough or series of parallel troughs with the next adjacent block or bar surface on the side toward the intake end of the machine. The curved groove of the tops of the blocks may be varied in contour and dimensions to accommodate the particular kind of fruit or other articles being handled. The moveable blocks or bars 11 are attached to a subframe 15 which is vertically reciprocated by means of lifting arms 16 attached by pivots 17 on brackets 18 which are fixed to the upright frame members 14, the lifting arms 16 being raised and lowered by the action of a cam 19 moving against a cam follower 20 attached at the center portion of the lifting arms 16, the cam being rotated on the shaft 21 driven by the motor 22. A connecting rod 23 is attached to a bell crank 24 which is connected at the pivot end of the lifting arm 16 to transmit the reciprocating motion from the cam follower 19 to a similarly arranged bell crank 24A attached to the frame at the opposite end of the machine, so that the subframe 15 and the blocks or bars 11 are simultaneously reciprocated vertically. The cam 19 is preferably shaped so that at the end of the upward movement of the frame, and at the end of the downward movement thereof, there is a brief period of no vertical motion. This pause appears to allow the fruit to come to momentary rest and tends to effect alignment of elongated fruit specimens with fewer reciprocation steps.

The vertically reciprocating blocks 11 are arranged between the fixed blocks 12, and up-and-down motion which carries the low point of the troughed top surface of the blocks 11 to an elevation above the high side of the troughed surface of the adjacent fixed block 12 so that a fruit specimen resting in the troughed reciprocating block would roll to the adjoining fixed block when the reciprocating block is at its highest position. When the reciprocating block is in its lowest position, the fruit specimen from the adjoining fixed block toward the feed side of the machine rolls down onto the troughed top surface of the reciprocating block. In this way, the fruit is progressively moved from the feed end to the discharge end, and at the same time is formed in single layered parallel rows following the troughs in the bars or blocks. At the discharge end the specimens of fruit are discharged at uniform intervals and spaced apart a fixed distance and may be delivered in this formation to other fruit handling equipment such as sizers, markers and the like. Fruit of elongated or ellipsoidal shape, such as a lemon, is aligned with its long axis crosswise of the machine, because of the step-by-step progression of the fruit in the troughed top surfaces of the blocks. The rate of reciprocation may be varied depending, among other things, upon the desired rate of delivery of aligned articles.

After the fruit has been distributed and aligned by a suitable length of reciprocating and fixed hollow surfaced block progression, it may be sized by progressively removing the largest specimens in the sizer portion of my combined machine. An aligned specimen is rolled onto the moveable block 11, for example, one marked R which is adjacent a trap door 31 arranged in one row or path of travel. As the reciprocating block R moves upward with the specimen of fruit resting in its hollow top surface, if it is of suitable thickness in the position as aligned, it is forced against and actuates the electrical contact switch 25 which closes an electrical circuit operating through the delay relay 26 to actuate a solenoid 27. The moving arm 28 of the solenoid is attached to a link 29 which is pivoted to the lever arm 30 of the trap door 31 which itself is hinged on the pivot 32 and opens the door downwardly so that the specimen of fruit, for example a lemon, which is large enough to actuate the contact switch 25 is at this point dropped out of the line of travel onto a cross conveyor belt 33 which carries the sized fruit away from the machine. If however, the specimen of fruit is not large enough to close the contacts 25, it rolls down the hollow top surface 34 of the trap door onto the next adjacent reciprocating block S at its low position from which it rolls, when the block is moved to its upper position, to the adjoining fixed block (marked T for identification). From this fixed block T, it rolls onto an adjoining moveable block marked W, which in its upward movement carries the specimen of fruit to a position where, if it is thick enough, it will close the spring contacts 25' which then causes the trap door 31' to open by the action of the delay relay 26' of the solenoid 27' to throw out the sized fruit onto another cross conveyor belt 33'. If, however, the fruit is too small to actuate the switch contacts 25', it moves on to other sets of moving and fixed blocks, contact switches trap-doors and operating mechanism therefore, where the specimen is either dropped out if it is large enough to actuate the contact switches or is discharged onto an end conveyor 35 which carries away the smallest fruit. The removal of the larger fruit specimens first, and the smaller fruit last, is one of the principal advantages of my sizer device.

Figure 6:
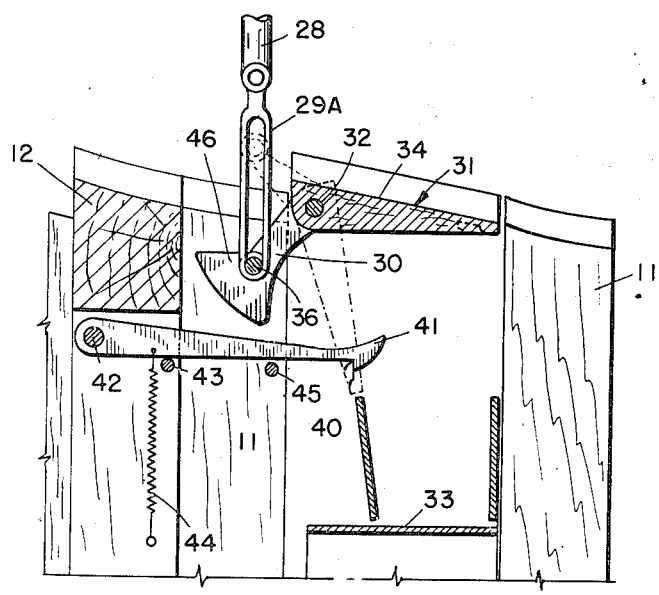
Fig. 6 is an alternative arrangement for retarding the return movement of the trap-doors of the sizer portion of my machine.

Instead of the delay relay arrangement for actuation of the trap door, the door may be held open long enough for the discharge of a specimen of fruit by the use of the loose link and latch arrangement shown in Fig. 6. The loose link 29A is attached to the solenoid as previously described and actuates the lever arm 30 on trap door 31. The trap door is provided with a catch bar 40 which is engaged by the latch member 41 which operates on the pivot 42 attached to the side of the fixed block 12 which is adjacent the moving block adjoining the trap door. A stop pin 43 is provided to prevent the latch member 41 from dropping down too low, and a tension spring 44 is attached to hold the latch member against the stop pin 43. A latch operating pin 45 is fixed in the sidewall of the reciprocating block 11. When the solenoid is actuated by the contact switch 25, it opens the trap door 31 through the action of the link member 29A on the lever arm 30. As soon as the switch contacts 25 are opened by the falling of the fruit specimen through the opening of the trap door, the solenoid arm 28 and the attached link 29A drop down, the open portion of the link sliding over the pivot 36. The latch member 41 upon the opening of the trap door engages the catch bar 40 to hold the trap door in open position until the moving block 11 on its next upward stroke releases the latch through actuation by the latch operating pin 45 which then allows the door to return to a closed position through the action of the counterbalancing weight 46.

In the form of my fruit aligning feeder shown in Figs. 7 and 8, the reciprocating motion on the moveable bars 11 is attained by providing a cam 19 acting directly on the subframe member 15 to which each of the vertically reciprocating bars 11 is attached by rods 50 sliding in bearings 51 mounted on a bearing support member 52, which is fixed to the frame members 14. A pile of fruit in disordered arrangement is fed to the device on a belt conveyor 55 discharging onto a fixed connecting platform 56 from which the individual specimens roll into the first set of moving blocks and then onto the succession of fixed and moving with hollow top surfaces blocks throughout the length of the aligning device. Fruit such as lemons is accurately aligned with the long axis extending in a direction crosswise to the travel of the fruit. The device delivers at the discharge end aligned fruit arranged in spaced apart rows at regular intervals, to any adjacent equipment where it is desired to inspect, grade, mark or otherwise handle the fruit in regular order in aligned axial position.

While my aligning feeder and sizer is particularly useful in handling elongated articles such as lemons, it may be applied to spherical or other shaped fruit or to other rollable articles.

I claim:

1. In a sizing machine for sizing mixed irregularly shaped elongated rollable articles, a frame; a feeder-aligner having means including parallel rows of troughs and alternately disposed vertically reciprocated bars, adapted to arrange the articles in single layer spaced apart rows with the longer axis at right angles to the paths of movement; a series of trap-doors arranged to receive the articles from each path; intervening troughed reciprocating aligner bars; actuating means for said bars disposed between said trap-doors; contact actuated means spaced above the entrance to each of said trap-doors adapted to cause opening of the trap-door when the article being advanced by the next adjoining reciprocating bar onto said trap-door is large enough to operate said contact means; and means for collecting and conveying away from the machine the segregated articles of different sizes.

2. In a sizing machine for sizing mixed elongated rollable articles, a frame; a feeder-aligner adapted to arrange the articles in single layer spaced apart rows with the longer axis at right angles to the paths of movement, said feeder-aligner comprising a bank of article supporting bars arranged in side-by-side relation transverse to the paths of the articles carried thereby, the top surfaces of said bars each being provided with a series of troughs substantially conforming to the rolling surface contour of said articles, said troughs forming parallel paths for the articles, each trough in each bar sloping downwardly toward the discharge end of the machine, actuating means for imparting alternating relative up-and-down movement to adjacent supporting bars to advance and align said articles; a series of trap-doors arranged at the lower end of each troughed path; intervening troughed aligner bars connected to said actuating means disposed between said trap-doors; contact actuated means spaced above the entrance to each of said trap-doors adapted to cause opening of the trap-door when the article being advanced by said moveable bars onto said trap-door is large enough to operate said contact means; and means for collecting and conveying away from the machine the segregated articles of different sizes.

3. In a sizing machine for sizing mixed elongated rollable articles, a frame; a feeder-aligner adapted to arrange the articles in single layer spaced apart rows with the longer axis at right angles to the paths of movement, said feeder-aligner comprising a bank of article supporting bars arranged in side-by-side relation transverse to the paths of the articles carried thereby, the top surfaces of said bars each being provided with a series of troughs substantially conforming to the rolling surface contour of said articles, said troughs forming parallel paths for the articles, each trough in each bar sloping downwardly toward the discharge end of the machine, actuating means for imparting alternating relative up-and-down movement to adjacent supporting bars to advance and align said articles; a series of trap-doors arranged at the lower end of each troughed path; intervening troughed aligner bars connected to said actuating means disposed between said trap-doors; and contact-actuated means spaced above the entrance to each of said trap doors adapted to cause opening of the trap-door when the article being advanced by said moveable bars onto said trap door is large enough to operate said contact means, said contact actuated means comprising an electric switch, a closiong member therefore, a time-delay relay, and a solenoid, said switch, relay and solenoid being electrically connected to an electric power source.

4. In a sizing machine for sizing mixed elongated rollable articles, a frame; a feeder-aligner adapted to arrange the articles in single layer spaced apart rows with the longer axis at right angles to the paths of movement, said feeder-aligner comprising a bank of article supporting bars arranged in side-by-side relation transverse to the paths of the articles carried thereby, the top surfaces of said bars each being provided with a series of troughs substantially conforming to the rolling surface contour of said articles, said troughs forming parallel paths for the articles, each trough in each bar sloping downwardly toward the discharge end of the machine, actuating means for imparting up-and-down movement to alternate adjacent supporting bars to advance and align said articles; a series of trap-doors arranged at the lower end of each troughed path; intervening troughed aligner bars connected to said actuating means disposed between said trap-doors; and contact-actuated means spaced above the entrance to each of said trap-doors adapted to cause opening of the trap-door when the article being advanced by said moveable bars onto said trap-door is large enough to operate said contact means; latch means for holding said trap-door open until the next article in the path is about to be advanced onto said trap-door, and means associated with the upward movement of an adjacent bar to release said latch.

VIRGIL H. TYLER.

REFERENCES CITED

The following references are of record in the file of this patent:

UNITED STATES PATENTS

| Number | Name | Date |
| --- | --- | --- |
| 1,607,932 | Whitmore | Nov. 23, 1926 |
| 1,970,107 | Stebler | Aug. 14, 1934 |
| 2,020,511 | McHenry | Nov. 12, 1935 |